E. & F. H. ROMANS.
Farm-Gates.
No. 205,211. Patented June 25, 1878.
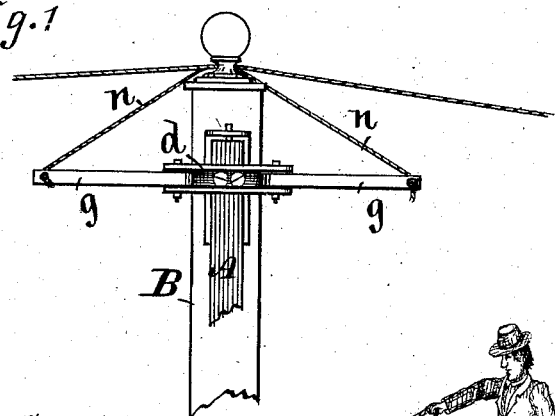
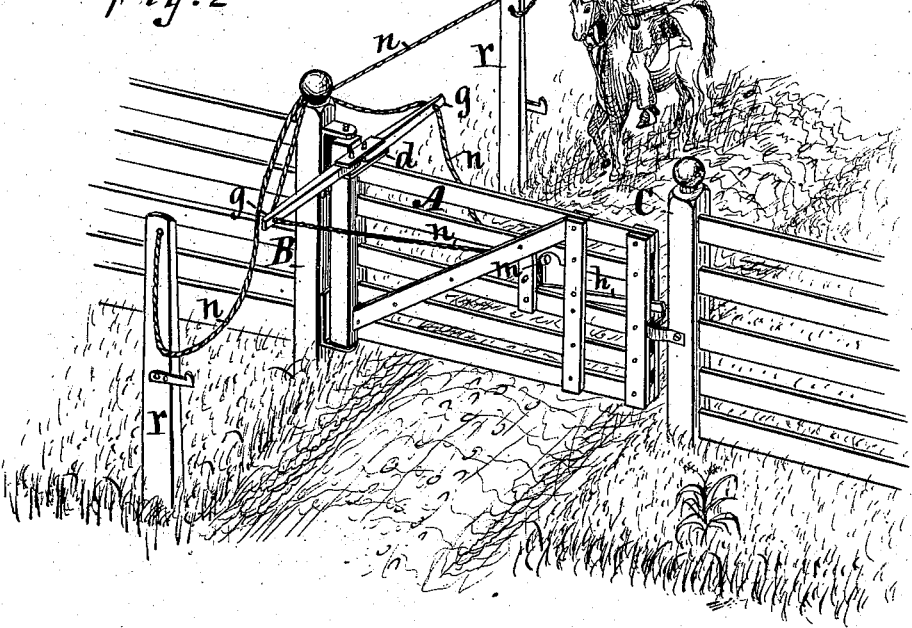
Witnesses:
R. G. Orwig.
Frank W. Heers.
Inventors:
Ephraim Romans,
Freeland H. Romans,
By Thomas G. Orwig,
Attorney.

UNITED STATES PATENT OFFICE.

EPHRAIM ROMANS AND FREELAND H. ROMANS, OF INDIANOLA, IOWA.

IMPROVEMENT IN FARM-GATES.

Specification forming part of Letters Patent No. 205,211, dated June 25, 1878; application filed December 17, 1877.

*To all whom it may concern:*

Be it known that we, EPHRAIM ROMANS and FREELAND H. ROMANS, of Indianola, in the county of Warren and State of Iowa, have invented an Improved Farm-Gate, of which the following is a specification:

Our improvement relates to the class of gates that are opened by equestrians and persons in vehicles by means of ropes; and our object is to make them operate more satisfactorily.

Our invention consists in hinging rope-bearing arms to the rear end of a gate, in such a manner that the ropes, combined with the gate-latch, will pass in reverse ways around the rear of the gate, through the swinging arms, and over suitable bearings, to unlatch the gate and always swing it away from the operator as he opens and closes it, all as hereinafter fully set forth.

Figure 1 of our drawing is a sectional elevation. Fig. 2 is a perspective of our complete gate in operation. Together they illustrate the construction, application, and operation of improvement.

A is a gate of common form, made from common fencing material in a common way. It is hinged to the gate-post B in any suitable way, so as to allow it to swing alternately to the right and left when it is disengaged from the gate-post C at its front end.

$d$ is an elevated socket, preferably made of cast metal, rigidly fixed to the rear and top portion of the gate A by means of screws or bolts. Its front side is open, to allow the arms to turn toward each other.

$g\ g$ represent rope-bearing arms hinged in the socket $d$, in such a manner that they will project horizontally at right angles to the gate, and in reverse ways from the opposite sides of the gate. $h$ represents a gravitating latch, pivoted to the front end of the gate. $m$ represents a weighted lever, pivoted to the gate in such a position relative to the gravitating latch $h$ that it will engage the rear end of the latch with its lower end. $n\ n$ are ropes fastened to the top end of the weighted lever $m$, and then passed on opposite sides of the gate through the ends of the hinged and projecting arms $g\ g$, and from thence in reverse ways around the rear of the gate through a suitable bearing formed in or attached to the gate-post B to suitable posts or supports $r\ r$, placed at some distance from each side of the gate.

In the practical operation of our invention, when a person on horseback or in a vehicle approaches our improved gate, that person can readily seize the rope nearest to him without dismounting, and, by simply pulling the rope, unlatch the gate, and cause it to swing open and away from him, to allow the latch $h$ to engage a latch-catching device fixed to the post $r$. The gate will be then retained in an open position until the mounted person has passed.

If a vehicle comes in contact with the projecting hinged arm $g$, that arm will readily turn out of the way by moving in the same direction that the vehicle moves.

To close the gate after passing it, the other rope, $n$, now within reach, is seized and pulled, and the gate is unlatched from the post $r$, and swung away from the operator again and closed.

It is, therefore, obvious that by means of the hinged arms $g$ the direction of the ropes $n$ is so maintained relative to the gate, either closed or open, that pulling upon the rope nearest the operator will cause the gate to move away from him, and that a person approaching from either side can readily open and close the gate without dismounting.

We are aware that a rope-bearing device has been rigidly fixed to a swinging gate, and ropes connected with a gravitating latch on the gate, in such a manner as to pass in reverse directions from the gate to swing it in opposite ways; but we claim that our hinged arms $g$, as arranged and combined with a gate and its gravitating latch, produces an improved farm-gate that can be advantageously opened and closed by equestrians or persons in vehicles.

We claim as our invention—

1. The hinged rope-bearing arms $g\ g$, in combination with a swinging gate, A, substantially as and for the purposes shown and described.

2. The combination of the socket $d$, the hinged rope-bearing arms $g$, the gravitating latch $h$, and the operating-ropes $n$ with a swinging gate, A, substantially as and for the purposes shown and described.

EPHRAIM ROMANS.
FREELAND H. ROMANS.

Witnesses:
R. C. BRAZZETTER,
WM. DAVIS.